(12) United States Patent
Huang et al.

(10) Patent No.: US 11,909,820 B2
(45) Date of Patent: Feb. 20, 2024

(54) METHOD AND APPARATUS FOR EXECUTION OF APPLICATIONS IN A CLOUD SYSTEM

(71) Applicant: NVIDIA Corporation, Santa Clara, CA (US)

(72) Inventors: Jen-Hsun Huang, Los Altos, CA (US); Xun Wang, San Jose, CA (US); Lorenzo Ibarria, Dublin, CA (US)

(73) Assignee: NVIDIA Corporation, Santa Clara, CA (US)

( * ) Notice: Subject to any disclaimer, the term of this patent is extended or adjusted under 35 U.S.C. 154(b) by 66 days.

(21) Appl. No.: 17/392,081

(22) Filed: Aug. 2, 2021

(65) Prior Publication Data

US 2021/0377341 A1    Dec. 2, 2021

Related U.S. Application Data

(63) Continuation of application No. 15/060,233, filed on Mar. 3, 2016, now Pat. No. 11,082,490, which is a (Continued)

(51) Int. Cl.
*H04L 67/1097* (2022.01)
*A63F 13/355* (2014.01)
(Continued)

(52) U.S. Cl.
CPC ........ *H04L 67/1097* (2013.01); *A63F 13/355* (2014.09); *G06F 9/45558* (2013.01);
(Continued)

(58) Field of Classification Search
CPC ......... A63F 13/355; G06F 2009/45595; G06F 9/45558; H04L 67/01; H04L 67/10; H04L 67/1097; H04L 67/125; H04L 67/565
(Continued)

(56) References Cited

U.S. PATENT DOCUMENTS 6,377,257 B1  4/2002  Borrel et al.
7,203,944 B1  4/2007  van Rietschote et al.
(Continued)

FOREIGN PATENT DOCUMENTS

CN    101340551 A    1/2009
CN    101802789 A    8/2010
(Continued)

OTHER PUBLICATIONS

"Etobicoke-Mimico Watershed Coalition", Google Drive, pp. 1-17 (Feb. 28, 2014).
(Continued)

*Primary Examiner* — David P Zarka
(74) *Attorney, Agent, or Firm* — Taylor English Duma L.L.P.

(57) ABSTRACT

A computer implemented method of executing applications in a cloud server system is presented. The method comprises receiving a file identifier from a client device. The method also comprises receiving a file associated with the file identifier from a first server. Further, the method comprises accessing an application associated with the file from memory of the cloud server. Also, the method comprises executing by the cloud server the application using the file received from the first server. Finally, the method comprises streaming results from the executing the application as a video stream destined for the client device.

20 Claims, 11 Drawing Sheets

Related U.S. Application Data continuation-in-part of application No. 14/137,789, filed on Dec. 20, 2013, now Pat. No. 10,217,444, and a continuation-in-part of application No. 14/137,722, filed on Dec. 20, 2013, now Pat. No. 10,049,646, and a continuation-in-part of application No. 14/092,872, filed on Nov. 27, 2013, now abandoned.

(60) Provisional application No. 61/874,056, filed on Sep. 5, 2013, provisional application No. 61/874,078, filed on Sep. 5, 2013, provisional application No. 61/749,231, filed on Jan. 4, 2013, provisional application No. 61/749,224, filed on Jan. 4, 2013, provisional application No. 61/730,939, filed on Nov. 28, 2012, provisional application No. 61/730,940, filed on Nov. 28, 2012.

(51) Int. Cl.
*G06F 9/455* (2018.01)
*H04L 67/125* (2022.01)
*H04L 67/10* (2022.01)
*H04L 67/01* (2022.01)
*H04L 67/565* (2022.01)

(52) U.S. Cl.
CPC .............. *H04L 67/01* (2022.05); *H04L 67/10* (2013.01); *H04L 67/125* (2013.01); *H04L 67/565* (2022.05); *G06F 2009/45595* (2013.01)

(58) Field of Classification Search
USPC ........................................................ 709/205
See application file for complete search history.

(56) References Cited

U.S. PATENT DOCUMENTS

| | | | |
|---|---|---|---|
| 7,698,178 | B2 | 4/2010 | Chu |
| 7,797,475 | B2 | 9/2010 | Wilson et al. |
| 7,849,196 | B2 | 12/2010 | Gkantsidis et al. |
| 7,933,829 | B2 | 4/2011 | Goldberg et al. |
| 8,135,626 | B2 | 3/2012 | Das et al. |
| 8,217,951 | B2 | 7/2012 | Jung |
| 8,286,196 | B2 | 10/2012 | Munshi et al. |
| 8,406,992 | B2 | 3/2013 | Laumeyer et al. |
| 8,464,250 | B1 | 6/2013 | Ansel |
| 8,572,407 | B1 | 10/2013 | Chengottarasappan et al. |
| 8,910,201 | B1 | 12/2014 | Zamiska et al. |
| 8,972,485 | B1 | 3/2015 | French et al. |
| 9,197,642 | B1 | 11/2015 | Urbach |
| 9,225,707 | B1* | 12/2015 | de Sousa ................. H04L 63/08 |
| 9,253,520 | B2 | 2/2016 | Shoemake et al. |
| 9,471,401 | B2 | 10/2016 | Munshi et al. |
| 9,483,627 | B1 | 11/2016 | Ferg et al. |
| 9,940,203 | B1* | 4/2018 | Ghatnekar .......... G06F 11/1464 |
| 10,114,966 | B2 | 10/2018 | Narayanaswamy et al. |
| 10,298,678 | B2 | 5/2019 | Castro et al. |
| 11,082,490 | B2* | 8/2021 | Huang .................. A63F 13/355 |
| 2002/0087403 | A1 | 7/2002 | Meyers et al. |
| 2002/0170067 | A1 | 11/2002 | Norstrom et al. |
| 2003/0064801 | A1 | 4/2003 | Breckner et al. |
| 2004/0044567 | A1 | 3/2004 | Willis |
| 2005/0028200 | A1 | 2/2005 | Sardera |
| 2005/0088445 | A1 | 4/2005 | Gonzalez et al. |
| 2005/0218943 | A1 | 10/2005 | Padhye et al. |
| 2005/0270298 | A1 | 12/2005 | Thieret |
| 2006/0240894 | A1 | 10/2006 | Andrews |
| 2006/0248256 | A1 | 11/2006 | Liu et al. |
| 2007/0008324 | A1 | 1/2007 | Green |
| 2007/0061202 | A1 | 3/2007 | Ellis et al. |
| 2007/0067535 | A1 | 3/2007 | Liu |
| 2007/0155195 | A1 | 7/2007 | He et al. |
| 2007/0195099 | A1 | 8/2007 | Diard et al. |
| 2007/0253594 | A1 | 11/2007 | Lu et al. |
| 2007/0294512 | A1 | 12/2007 | Crutchfield et al. |
| 2007/0299682 | A1 | 12/2007 | Roth et al. |
| 2008/0079758 | A1 | 4/2008 | Hayashibara |
| 2008/0139306 | A1 | 6/2008 | Lutnick et al. |
| 2008/0239159 | A1 | 10/2008 | Read et al. |
| 2008/0276220 | A1 | 11/2008 | Munshi et al. |
| 2008/0307244 | A1 | 12/2008 | Bertelsen et al. |
| 2009/0125226 | A1 | 5/2009 | Laumeyer et al. |
| 2009/0144361 | A1 | 6/2009 | Nobakht et al. |
| 2009/0248534 | A1 | 10/2009 | Dasdan et al. |
| 2010/0110085 | A1 | 5/2010 | Samuel et al. |
| 2010/0122286 | A1 | 5/2010 | Begeja et al. |
| 2010/0125529 | A1 | 5/2010 | Srinivasan et al. |
| 2010/0231044 | A1 | 9/2010 | Tatsumi et al. |
| 2010/0332331 | A1 | 12/2010 | Etchegoyen |
| 2011/0102443 | A1 | 5/2011 | Dror et al. |
| 2011/0205680 | A1 | 8/2011 | Kidd et al. |
| 2011/0218025 | A1 | 9/2011 | Katz et al. |
| 2011/0265164 | A1* | 10/2011 | Lucovsky ........... G06F 9/45533 718/1 |
| 2011/0289134 | A1 | 11/2011 | de los Reyes et al. |
| 2011/0292057 | A1 | 12/2011 | Schmit et al. |
| 2011/0296452 | A1 | 12/2011 | Yu et al. |
| 2011/0304634 | A1 | 12/2011 | Urbach |
| 2011/0314314 | A1 | 12/2011 | Sengupta |
| 2012/0054744 | A1 | 3/2012 | Singh et al. |
| 2012/0076197 | A1 | 3/2012 | Byford et al. |
| 2012/0149464 | A1 | 6/2012 | Bone et al. |
| 2012/0172088 | A1 | 7/2012 | Kirch et al. |
| 2012/0220372 | A1 | 8/2012 | Cheung et al. |
| 2012/0230242 | A1 | 9/2012 | Kim et al. |
| 2012/0232988 | A1 | 9/2012 | Yang et al. |
| 2012/0259233 | A1 | 10/2012 | Chan et al. |
| 2012/0297189 | A1 | 11/2012 | Hayton et al. |
| 2012/0324358 | A1 | 12/2012 | Jooste |
| 2013/0021353 | A1 | 1/2013 | Drebin et al. |
| 2013/0023340 | A1 | 1/2013 | Lee et al. |
| 2013/0055252 | A1 | 2/2013 | Lagar-Cavilla et al. |
| 2013/0060842 | A1 | 3/2013 | Grossman |
| 2013/0104044 | A1 | 4/2013 | Gujarathi et al. |
| 2013/0138810 | A1* | 5/2013 | Binyamin ............. G06F 9/5072 709/225 |
| 2013/0148851 | A1 | 6/2013 | Leung et al. |
| 2013/0158892 | A1 | 6/2013 | Heron et al. |
| 2013/0225080 | A1 | 8/2013 | Doss et al. |
| 2013/0227085 | A1 | 8/2013 | Choi et al. |
| 2013/0290711 | A1 | 10/2013 | Rajkumar et al. |
| 2013/0297680 | A1* | 11/2013 | Smith .................... H04L 67/06 709/217 |
| 2013/0311548 | A1 | 11/2013 | Huang et al. |
| 2014/0009576 | A1 | 1/2014 | Hadzic et al. |
| 2014/0101434 | A1 | 4/2014 | Senthurpandi et al. |
| 2014/0344283 | A1 | 11/2014 | Nicholls |
| 2014/0344705 | A1* | 11/2014 | Dimitrov .............. G06F 3/0481 715/744 |
| 2015/0099590 | A1 | 4/2015 | Lee et al. |
| 2015/0188990 | A1 | 7/2015 | Kacmarcik et al. |
| 2015/0363609 | A1 | 12/2015 | Huang et al. |
| 2016/0292193 | A1 | 10/2016 | Madanapalli et al. |
| 2016/0344745 | A1 | 11/2016 | Johnson et al. |

FOREIGN PATENT DOCUMENTS

| | | | |
|---|---|---|---|
| WO | 2007/016660 | A2 | 2/2007 |
| WO | 2007/018880 | A1 | 2/2007 |
| WO | 2010/078539 | A2 | 7/2010 |

OTHER PUBLICATIONS

"Google Drive User Guide Pdf—Google Search", Google search history, pp. 1-2 (Dec. 31, 2015).

Agar-Cavilla, H. A., et al.; "Snowflock: Virtual Machine Cloning as a First-Class Cloud Primitive", ACM Transactions on Computer Systems (TOCS), vol. 29, Issue 1, Article 2, pp. 1-50 (Feb. 2011).

Leather, A., "Intel Xeon E5-2670 Review", pp. 1-4 (Mar. 6, 2012), Retrieved from the Internet URL: https://www.bit-tech.net/reviews/tech/cpus/intel-xeon-e5-2670-review/1/, Retrieved on Oct. 28, 2021.

(56) References Cited

OTHER PUBLICATIONS

Merriam-Webster's Collegiate Dictionary, 10th Edition, pp. 1-4 (1993).
Shrout, R., "Galaxy GeForce GT 640 GC 1GB DDR3 Review—GK107 is no GK104", pp. 1-13 (Jun. 20, 2012); Retrieved from the Internet URL: https://pcper.com/2012/06/galaxy-geforce-gt-640-gc-1gb-ddr3-review-gk107-is-no-gk104/12/; Retrieved on Oct. 28, 2021.

\* cited by examiner

METHOD AND APPARATUS FOR EXECUTION OF APPLICATIONS IN A CLOUD SYSTEM

CROSS-REFERENCE TO RELATED APPLICATIONS

This application claims the benefit of and priority to provisional application 61/730,939, filed Nov. 28, 2012, provisional application 61/730,940, filed Nov. 28, 2012, provisional application 61/749,231, filed Jan. 4, 2013, provisional application 61/749,224, filed Jan. 4, 2013, provisional application 61/874,078, filed Sep. 5, 2013, provisional application 61/874,056, filed Sep. 5, 2013, this application is a continuation-in-part to U.S. patent application Ser. No. 14/092,872, filed Nov. 27, 2013, a continuation-in-part to U.S. patent application Ser. No. 14/137,789, filed Dec. 20, 2013, and a continuation-in-part to U.S. patent application Ser. No. 14/137,722, filed Dec. 20, 2013. This application is a continuation of U.S. patent application Ser. No. 15/060,233, filed Mar. 3, 2016. Each of these applications is incorporated herein by reference in its entirety.

BACKGROUND

Historically, an application such as SolidWorks was executed using a user's personal computer (PC) on which the application was installed. A user purchased or received a temporary license to use the application, which was loaded and installed onto the PC and then executed and utilized in a well-known manner.

In order to share a file associated with a particular application, e.g., a SolidWorks file with colleagues or friends, a user would typically email the file or transfer the file using some form of removable storage media, e.g., a disk, USB flash drive or external hard drive. In the case of larger files sizes, however, using removable storage media was typically the only available option because of email size limits. In order to view or alter the contents of the file, the person to whom the file was transferred would need to have an installation of the associated software on his computer. Transferring files over to another user's computer was, therefore, cumbersome and inefficient.

With the advent of cloud storage systems, it has become increasingly popular among users to share files with their friends and colleagues over the cloud. For example, a user with an online storage and file sharing account such as Dropbox can simply share a file by sending the recipient a link to the file in the cloud. Using the link, the recipient is then able to download the file to his local computer, and execute an application associated with the file.

While current cloud storage systems make the storage of files in the cloud easier, they provide no means of performing any computing in the cloud, thereby, requiring that the applications required to manipulate the shared files be installed on the recipient's local machine. This results in loss of productivity and inflexibility. In other words, in order to view or make modifications to the contents of the file, the user needs to take the extra steps of purchasing a license to use the application and/or installing the application on his local machine.

Further, with the proliferation of mobile devices and mobile computing, it has become increasingly common for users to view files on their mobile devices, which can be manipulated using the touchscreen controls of the mobile device. Because mobile phones are not manufactured to be able to execute memory and processing intensive applications, e.g., SolidWorks, the memory and processing power of such mobile phones are often too low to execute many applications. Another problem with mobile devices is that they are often unable to support certain applications because such applications require certain operating system environments to run.

This situation results in the cloud environment providing flexible and easy access to different files, but, unfortunately, the files cannot be opened on certain mobile devices because the required application is not installed on the mobile device. Even if the application is stored on the requesting computer, maybe the requested file needs a different version of the application to open the file properly. In such case, the requesting computer will not be able to open the file.

SUMMARY ON INVENTION

Accordingly, a need exists for a cloud server system wherein a requesting computer device can request a file and open the file without needing the corresponding application to be installed on the requesting computer device. Within such a system, computing can be performed on the file in the cloud and the results streamed to an end-user in real-time. In one embodiment, the present invention is a method and apparatus for executing applications in the cloud and streaming the results of the executed application to a client device in the form of an encoded video stream User interaction with the streamed results can be transmitted from the client device back to the cloud server for execution of the application on the file. Accordingly, embodiments of the present invention advantageously facilitate file sharing by allowing users to view or modify files shared by other users without needing to install the applications corresponding to the files on their local devices. In effect, the application execution is a proxy on the cloud server. This object is achieved by locking the tool or tool adaptor to the extension device using a sliding or snap positive connection. Advantageous and expedient improvements on the sliding or snap positive connection are specified below.

Further, embodiments of the present invention allow files shared through the cloud to be viewed and manipulated on any kind of client device, e.g., a mobile phone, a tablet computer. Because the applications corresponding to the files are executed in the cloud, the recipient devices do not need to have the computing power necessary to execute the applications. Only the computing power needed to receive and display the results and report out user input is required at the client. Accordingly, resource intensive applications can be run in the cloud and the associated files can be readily accessed at any type of device, e.g., thin clients, dumb terminals etc.

In one embodiment, a computer implemented method of executing applications in a cloud server system is presented. The method comprises receiving a file identifier from a client device. The method also comprises receiving a file associated with the file identifier from a first server. Further, the method comprises accessing an application associated with the file from memory of the cloud server. Also, the method comprises executing by the cloud server the application using the file received from the first server. Finally, the method comprises streaming results from the executing the application as a video stream destined for the client device.

In one embodiment, the method further comprises receiving information concerning modifications to be performed on the file from the client device. Further, the method comprises performing by the cloud server the modifications on the file and to produce a modified file. Finally, the method comprises transmitting the modified file to the first server.

In one embodiment, a cloud server is presented. The cloud server comprises a plurality of virtual machines, wherein each virtual machine executes on at least one processor within the cloud server, and wherein a virtual machine comprises: (a) an agent module operable to receive an identifier of a file from a client device, the agent module further operable to request the file from an external file server, for receiving the file therefrom, and for automatically determining an application program associated with the file; (b) an execution module for instantiating the application program and execution the application program associated with the file; and (c) a streaming module operable to: 1) stream display output resulting from execution of the application program, the display output stream for receipt by the client device; and 2) receive user input from the client device, the user input associated with the execution of the application program.

In a different embodiment, a cloud based computer system is presented. The cloud based computer system comprises a processor coupled to a bus, the processor for implementing a proxy application execution environment, the proxy application execution environment comprising: (a) a first module for receiving an identifier of a file from a client device, the first module for requesting the file from an external file server and for receiving the file therefrom; (1) an agent module for automatically determining an application program associated with the file; (2) an execution module for instantiating the application program and executing the application program on the file; and (c) a streaming module for: 1) streaming display output resulting from execution of the application program, the display output streamed for receipt by the client device; and 2) receiving user input from the client device, the user input associated with the execution of the application program.

The following detailed description together with the accompanying drawings will provide a better understanding of the nature and advantages of the present invention.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
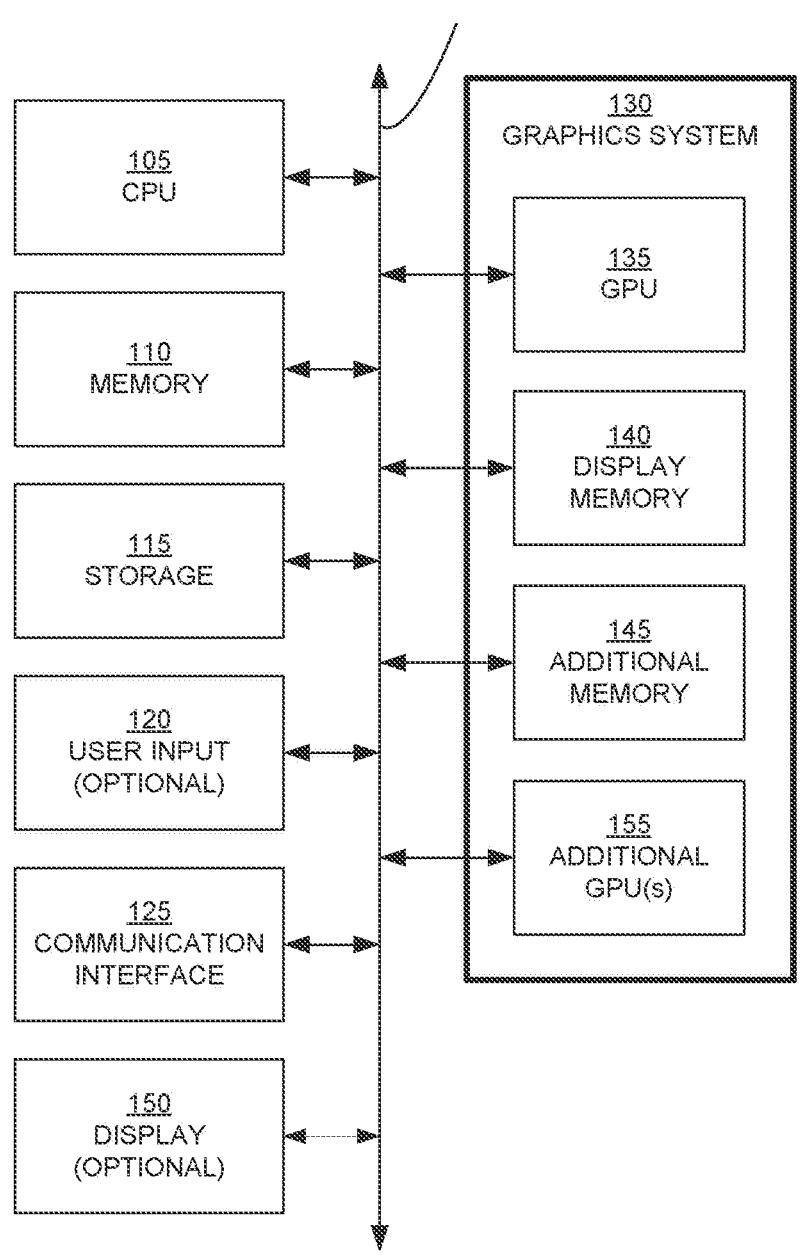
FIG. 1 depicts a block diagram of an exemplary client or cloud application server computer system suitable for implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follows are presented and discussed in terms of a process or method. Although steps and sequencing thereof are disclosed in figures (e.g. FIG. 9) herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "executing," "streaming," (e.g., flowchart 900 of FIG. 9) or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Further, while embodiments described herein may make reference to a GPU, it is to be understood that the circuits and/or functionality described herein could also be implemented in other types of processors, such as general-purpose or other special-purpose coprocessors, or within a CPU.

FIG. 1 depicts a block diagram of an exemplary client or cloud application server computer system suitable for implementing embodiments according to the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 105 and a system memory 110. For example, computing system 100 may be used to implement a client side device or a server side device, e.g., an application or file server in accordance with an embodiment of the present invention.

It is appreciated that computer system 100 described herein illustrates an exemplary configuration of an operational platform upon which embodiments may be implemented to advantage. Nevertheless, other computer system with differing configurations can also be used in place of computer system 100 within the scope of the present invention. That is, computer system 100 can include elements other than those described in conjunction with FIG. 1. Moreover, embodiments may be practiced on any system which can be configured to enable it, not just computer systems like computer system 100. It is understood that embodiments can be practiced on many different types of computer systems 100. System 100 can be implemented as, for example, a desktop computer system or server computer system having a power general-purpose CPUs coupled to a dedicated graphics rendering GPU. In such an embodiment, components can be included that add peripheral buses, specialized audio/video components, I/O devices, and the like. Similarly system 100 can be implemented as a hand-held device (e.g., cell phone, etc.) or a set-top video game console device, such as, for example PlayStation3®, available from Sony Computer Entertainment Corporation of Tokyo, Japan. System 100 can also be implemented as a "system on a chip", where the electronics (e.g., the components 105, 110, 115, 120, 125, 130, 150, and the like) of a computing device are wholly contained within a single integrated circuit die. Examples include a hand-held instrument with a display, a car navigation system, a portable entertainment system, and the like.

In the example of FIG. 1, the computer system 100 includes a central processing unit (CPU) 105 for running software applications and optionally an operating system Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including the Internet. The optional display device 150 may be any device capable of displaying visual information in response to a signal from the computer system 100. The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications executing in parallel.

Graphics memory may include a display memory 140 (e.g., a frame buffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2:
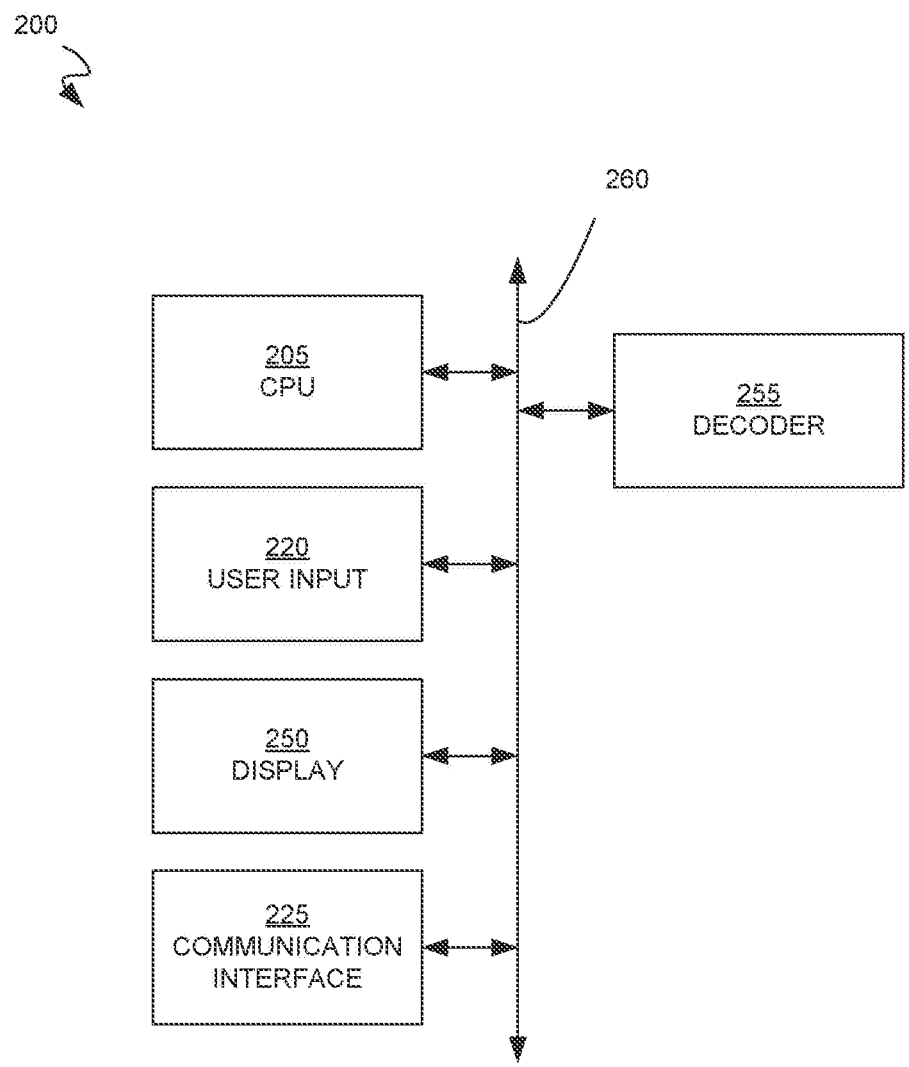
FIG. 2 is a block diagram of an example of a client device capable of implementing embodiments according to the present invention.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, and/or microphones. The client device 200 may, for example, have an executed application streamed to it from an application server and be able to transmit a user input from a client to the application server in accordance with an embodiment of the present invention.

The communication interface 225 allows the client device 200 to communicate with other computer systems (e.g., the computer system 100 of FIG. 1) via an electronic communications network, including wired and/or wireless communication and including the Internet. The decoder 255 may be any device capable of decoding (decompressing) data that may be encoded (compressed). For example, the decoder 255 may be an H.264 decoder. The display device 250 may be any device capable of displaying visual information, including information received from the decoder 255. The display device 250 may be used to display visual information generated at least in part by the client device 200. However, the display device 250 may be used to display visual information received from the computer system 100. The components of the client device 200 may be coupled via one or more data buses 260. Further, the components may or may not be physically included inside the housing of the client device 200. For example, the display 250 may be a monitor that the client device 200 communicates with either through cable or wirelessly.

Relative to the computer system 100, the client device 200 in the example of FIG. 2 may have fewer components and less functionality and, as such, may be referred to as a thin client. In general, the client device 200 may be any type of device that has display capability, the capability to decode (decompress) data, and the capability to receive inputs from a user and send such inputs to the computer system 100. However, the client device 200 may have additional capabilities beyond those just mentioned. The client device 200 may be, for example, a personal computer, a tablet computer, a television, a hand-held gaming system, or the like.

Figure 3:
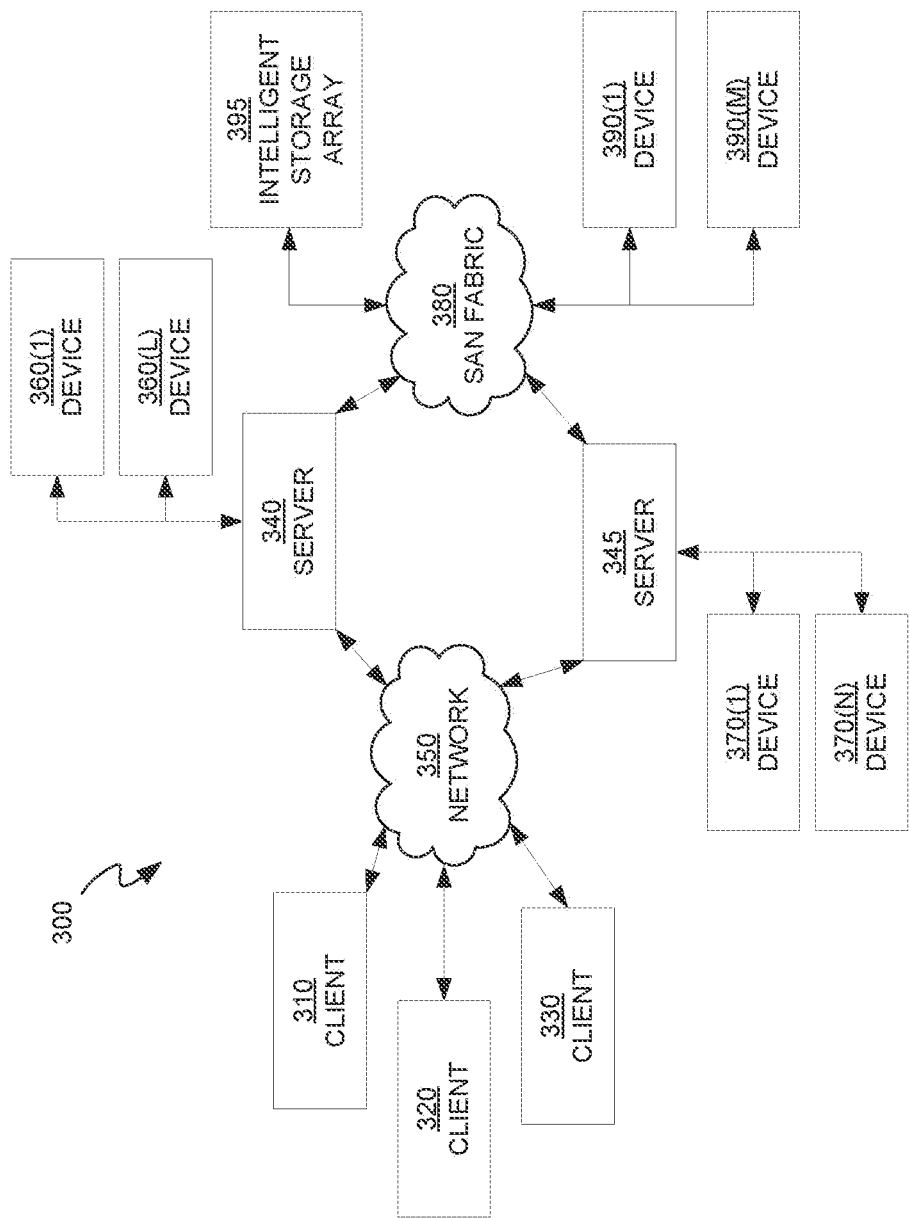
FIG. 3 is a block diagram of an example of a communication network architecture in which client systems and servers may be coupled to a network, according to embodiments of the present invention.

FIG. 3 is a block diagram of an example of a communication network architecture 300 in which client systems 310, 320, and 330 and servers 340 and 345 may be coupled to a network 350. Client systems 310, 320, and 330 generally represent any type or form of computing device or system, such as computing system 100 of FIG. 1 and/or client device 200 of FIG. 2.

Similarly, servers 340 and 345 generally represent computing devices or systems, such as application servers, GPU servers, or database servers, configured to provide various database services and/or run certain software applications. Network 350 generally represents any telecommunication or computer network including, for example, an intranet, a wide area network (WAN), a local area network (LAN), a personal area network (PAN), or the Internet. For example, an application server, e.g., server 340 may be used to stream results of an application execution to a client device, e.g., device 310 over network 350.

With reference to computing system 100 of FIG. 1, a communication interface, such as communication interface 125, may be used to provide connectivity between each client system 310, 320, and 330 and network 350. Client systems 310, 320, and 330 may be able to access information on server 340 or 345 using, for example, a web browser or other client software. In that manner, client systems 310, 320, and 330 are configurable to access servers 340 and/or 345 that provide for graphics processing capabilities, thereby off-loading graphics processing to the back end servers 340 and/or 345 for purposes of display at the front end client systems 310, 320, and 330. Further, such software may allow client systems 310, 320, and 330 to access data hosted by server 340, server 345, storage devices 360(1)-(L), storage devices 370(1)-(N), storage devices 390(1)-(M), or intelligent storage array 395. Although FIG. 3 depicts the use of a network (such as the Internet) for exchanging data, the embodiments described herein are not limited to the internet or any particular network-based environment.

In one embodiment, all or a portion of one or more of the example embodiments disclosed herein are encoded as a computer program and loaded onto and executed by server 340, server 345, storage devices 360(1)-(L), storage devices 370(1)-(N), storage devices 390(1)-(M), intelligent storage array 395, or any combination thereof. All or a portion of one or more of the example embodiments disclosed herein may also be encoded as a computer program, stored in server 340, run by server 345, and distributed to client systems 310, 320, and 330 over network 350.

Method and Apparatus for Execution of Applications in A Cloud System

Figure 4:
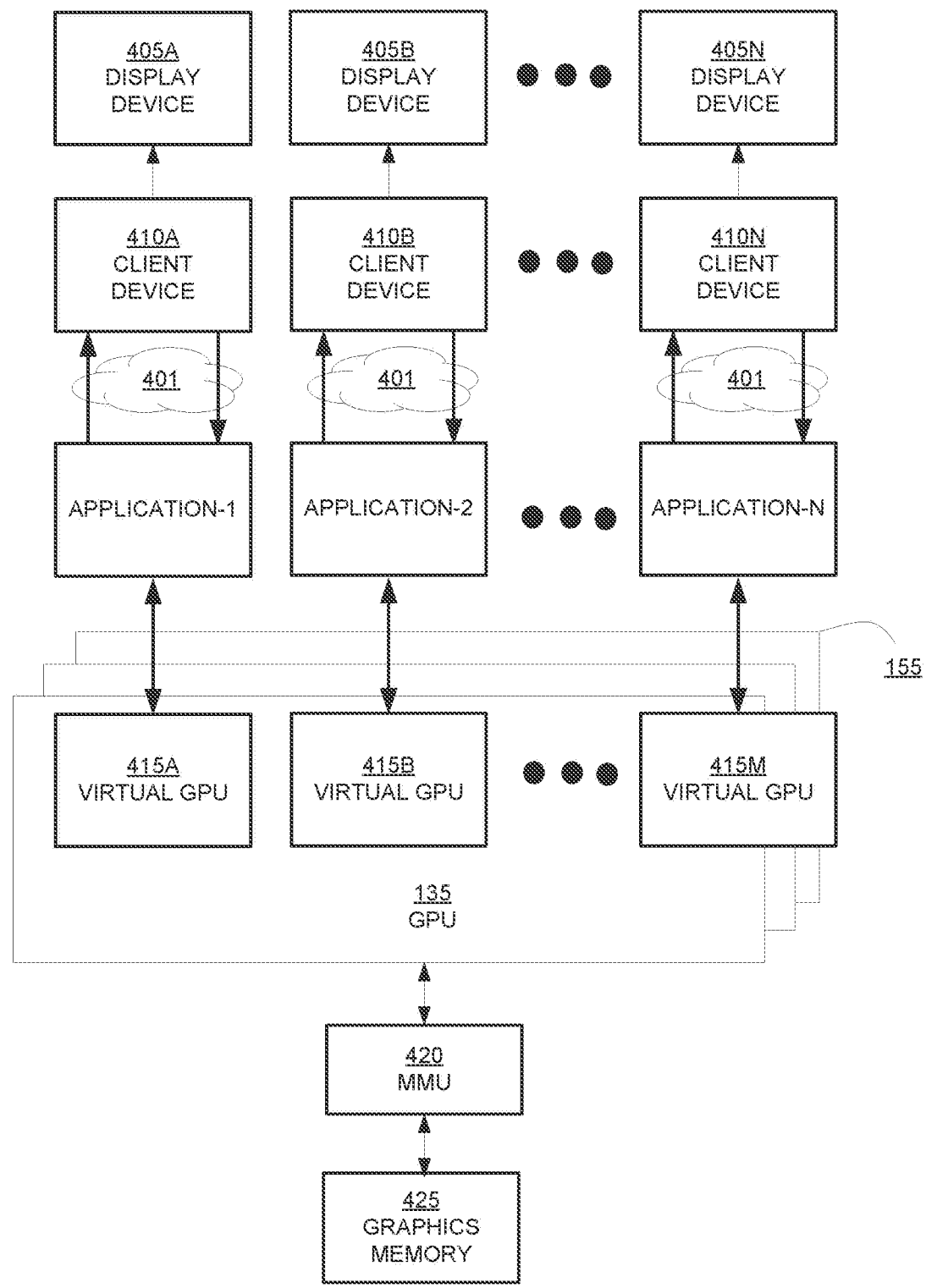
FIG. 4 illustrates a graphics system configurable for implementing cloud based virtualized application execution for remote displays, in accordance with one embodiment of the present disclosure.

FIG. 4 illustrates a graphics system 400A configurable for implementing cloud based virtualized application execution for remote displays, in accordance with one embodiment of the present disclosure. As shown, the graphics processing system 400A includes a physical GPU 135 of FIG. 1, although system 400A can include additional physical GPUs 155 as described above.

According to embodiments of the present invention, the physical GPU 135 is configured for concurrent use by a number N of applications 1, 2, . . . , N. More specifically, the physical GPU 135 is configured as a number M of virtual GPU s 415A, 415B, . . . , 415M that are concurrently used by the applications 1, 2, . . . , N. Each of the additional GPUs 155 may be similarly configured as multiple virtual GPUs. Each virtual GPU may execute at least one application. In one embodiment, the GPU 135 and the additional GPUs 155 are coupled to a memory management unit 420 (MMU; e.g., an input/output MMU) that is in turn coupled to graphics memory, described in conjunction with FIG. 1.

In one embodiment, the applications 1, 2, . . . , N are executable applications, e.g., video games, Adobe Photoshop, Microsoft Office; however, the invention is not so limited. That is, the applications 1, 2, . . . , N can be any type of application. For example, the application may provide financial services, computer aided design (CAD) services, etc. In still another example, the application may be a programming guide that provides, in table form, a list of the various programs that are available on different television channels in different time slots, and the client device may be a set top box (cable or satellite).

Figure 5A:
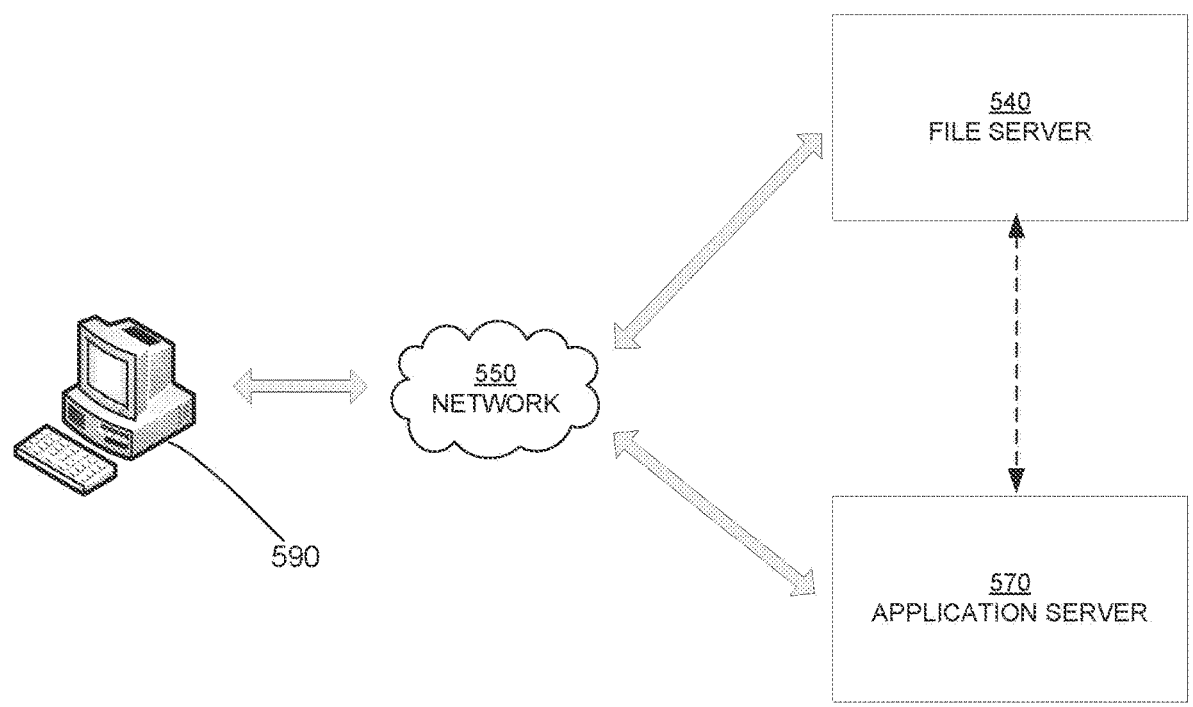
FIG. 5A is a high level block diagram illustrating the manner in which applications can be executed in the cloud but provide client interaction therewith in accordance with an exemplary embodiment of the present invention.

FIG. 5A is a high level block diagram illustrating the manner in which applications can be executed in the cloud but provide client interaction therewith in accordance with an exemplary embodiment of the present invention. A user at remote terminal 590, which may be a thin client, personal computer, handheld phone, etc., for example, can access a shared file through network 550, for instance, hosted at a file server 540 maintained by a cloud storage and file synchronization company, e.g., Dropbox. If the user wishes to view the contents of the file, or execute the application associated with the file to alter the contents of the file, he may, for example, double-click the file through a user interface (e.g., graphical user interface) accessible at remote terminal 590 and provided by the cloud storage provider. In response, the file is communicated over to application server 570, wherein the application server hosts a plurality of applications in an application database that are associated with the files stored on file server 540. Execution results of the application with the file are communicated to the client 590 and user input from the client 590 is communicated to application server 570.

In this way, embodiments of the present invention advantageously allow a user to view the contents of a file or manipulate them without needing to download the file and/or install a copy of the associated application on their local device 590. Embodiments of the present invention also allow a user to easily share files with friends and colleagues without needing to ensure that the recipient owns or has a license to the corresponding software.

By way of example, application server 570 may host the SolidWorks application. Accordingly, if the user tries to access a SolidWorks file, the file is communicated to application server 570, wherein the SolidWorks application executes on application server 570. Subsequently, the results may be communicated back to the client at terminal 590 through an encoded video stream transmitted by a streaming client executing on application server 570. Further, the user input from a user may be communicated upstream from client terminal 590 back up to the application server 570.

In one embodiment, the GRID architecture, as discussed in the GRID architecture applications, is used to implement the cloud based virtualized graphics processing necessary for remotely displaying the results of executing the SolidWorks application at remote terminal 590. Further, as discussed in the GRID architecture applications, when the SolidWorks application, for example, is executed, the results are turned into a video stream and sent out over the appropriate channels to a receiver at the client device 590. Further, as noted above, user inputs from client device 590 are transmitted back to the application server 570.

Figure 5B:
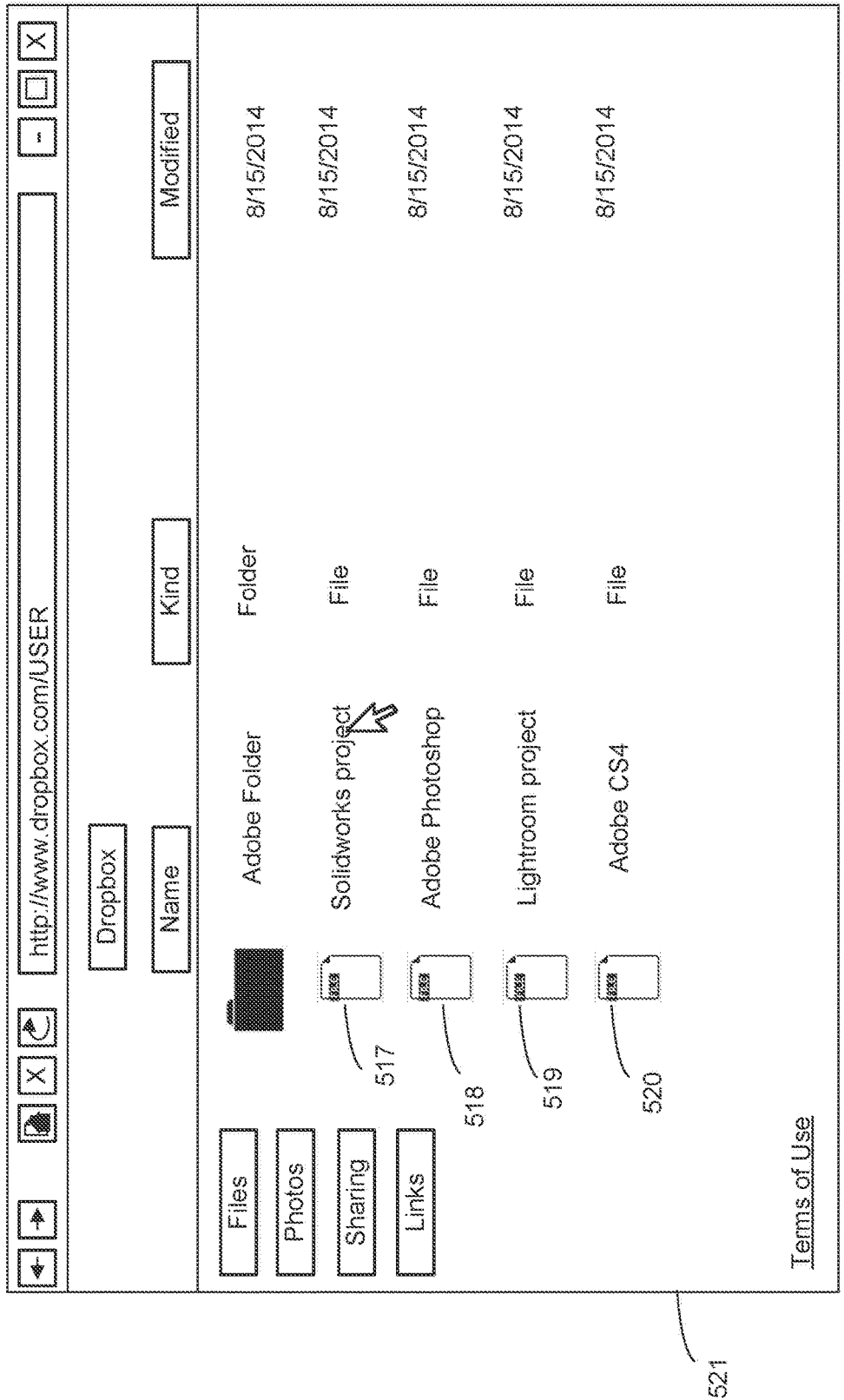
FIG. 5B illustrates an exemplary on screen display of a user interface for accessing files at a file server of FIG. 5A in accordance with an embodiment of the present invention.

FIG. 5B illustrates an exemplary on screen display of a user interface on the client device for accessing files at a file server of FIG. 5A in accordance with an embodiment of the present invention. In order to access the shared files, e.g., files 517, 518, 519 and 520 at file server 540, for example, the user may log onto the user interface 521 of his online cloud storage account, e.g., at Dropbox or a similar cloud storage service through a web browser of the client device.

In conventional storage systems, after accessing the user interface, a user would have the option of downloading one of the available shared files to his personal computer in order to view or manipulate the contents of the file using a locally installed version of the associated application. In the case of certain files, e.g., music files such as mp3s, clicking on the files through user interface 521 may automatically initiate an application local to the user's computer, wherein the contents of the file are played (using the locally installed version of the associated application, e.g., QuickTime) as the file is being streamed to the client device during the download process.

In contrast to conventional storage systems, embodiments of the present invention do not download the file to the user's computer in response to the user attempting to access or open a shared file from user interface 521. Instead, in one embodiment of the present invention, the application associated with the file is executed on the remote application server and the results are streamed to the client at the client terminal in the form of an encoded video stream and user input is transmitted upstream from a client back to the application server.

Figure 5C:
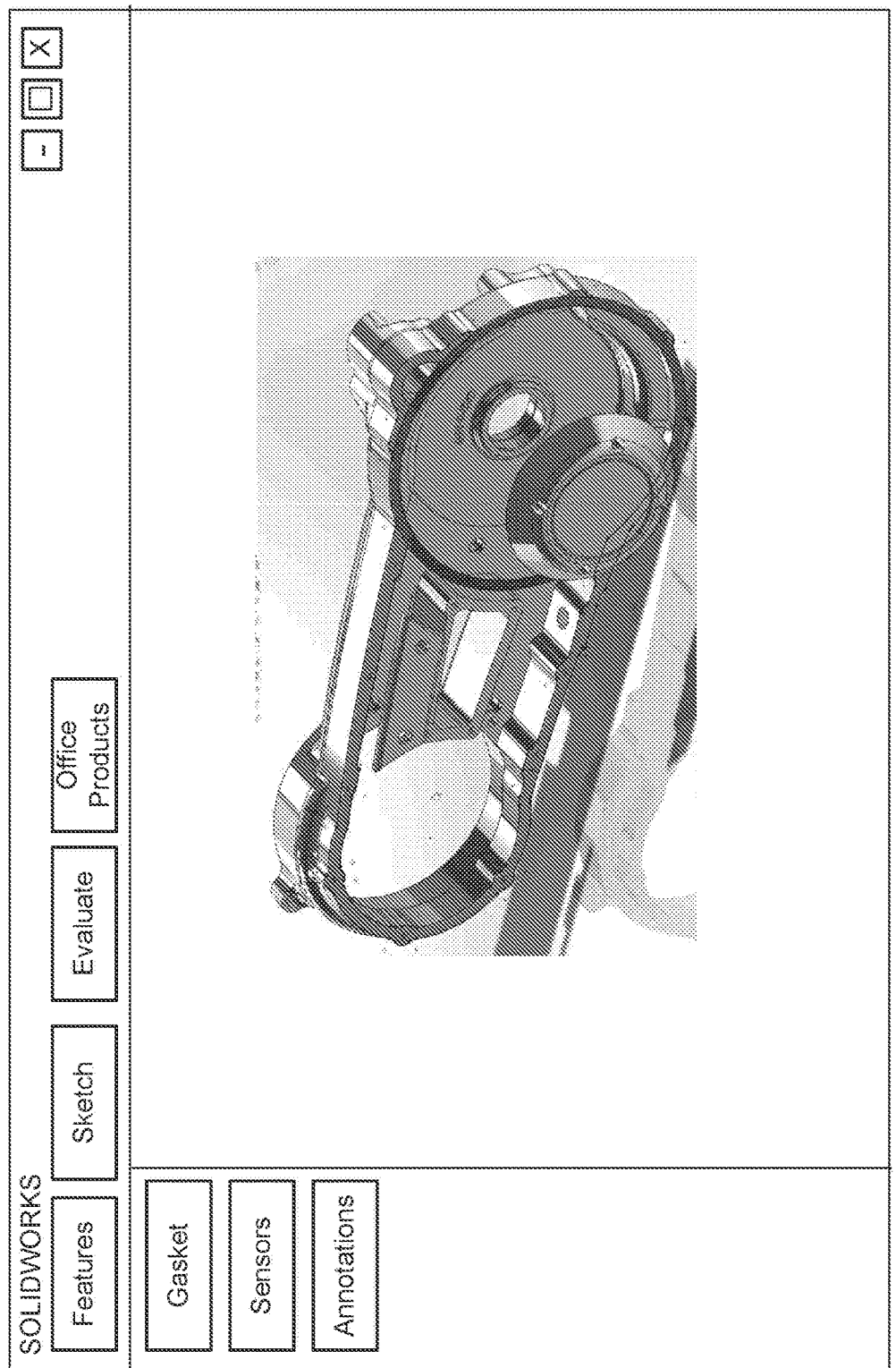
FIG. 5C illustrates the exemplary on screen display of a user interface relayed to the client device in response to executing an application in the cloud in accordance with an embodiment of the present invention.

FIG. 5C illustrates the exemplary on screen display of a user interface relayed to the client device in response to executing an application in the cloud in accordance with an embodiment of the present invention. If the user, for example, double-clicks file 517 in user interface 521, the file is transmitted from file server 540 to application server 570 where it is launched using the SolidWorks application for instance. In one embodiment, the graphical user interface 555 of the SolidWorks application with the selected file 517 instantiated therein is transmitted to the client in the form of an encoded video stream for display on the client display as shown in FIG. 5C. Also the user input from a client is transmitted up to the server 570.

Figure 6:
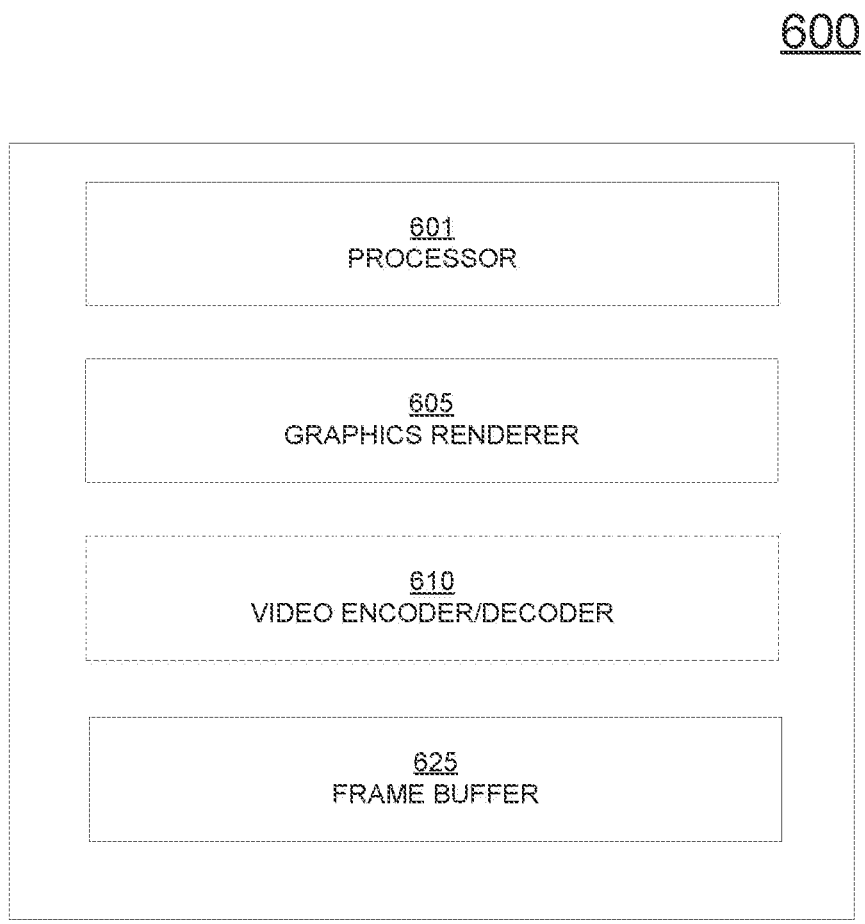
FIG. 6 illustrates exemplary components of a system implemented on the application server for rendering an encoded video stream that is transmitted to a client terminal and user input received from the client terminal in accordance with an embodiment of the present invention.

FIG. 6 illustrates exemplary components of a system implemented on the application server for rendering an encoded video stream that is transmitted to a client terminal and user input received from the client terminal in accordance with an embodiment of the present invention. As discussed in detail in the GRID architecture applications, within the application server 570, a processor 601 can be configured, for example, for initializing an instantiation of an application. In one embodiment, the processor 601 can be a virtual machine that is supported by cloud based graphics processing system that provides, in part, virtualized graphics rendering and processing for remote displays. The application that is instantiated within the virtual machine undergoes a loading process in order to initialize the application. In one embodiment, the virtual machine can be a virtual GPU as shown in FIG. 4.

In one embodiment, the loading process includes determining the proper configuration settings for the virtual machine when executing the application. The configuration settings may take into account the resource capabilities of the virtual machine, as well as the resource capabilities of the end client device.

System 600 includes a graphics renderer 605 for performing graphics rendering to generate a plurality of frames forming the basis of a video stream. The graphics rendering is performed through execution of the application, wherein the video stream comprises the plurality of frames associated with the executed application, e.g., the user interface illustrated in FIG. 5C.

In one embodiment, optionally the system 600 includes a video encoder/decoder 610 that encodes the rendered video into a compressed format before delivering encoded video stream to a remote display.

System 600 may include a frame buffer 625 for receiving in sequence a plurality of frames associated with the video stream. In one embodiment, the graphics rendering is performed by the virtual machine in the cloud based graphics rendering system, wherein the video stream of rendered video is then delivered to a remote display. The frame buffer comprises one or more frame buffers configured to receive the rendered video frame. For example, a graphics pipeline may output its rendered video to a corresponding frame buffer. In a parallel system, each pipeline of a multi-pipeline graphics processor will output its rendered video to a corresponding frame buffer.

Figure 7:
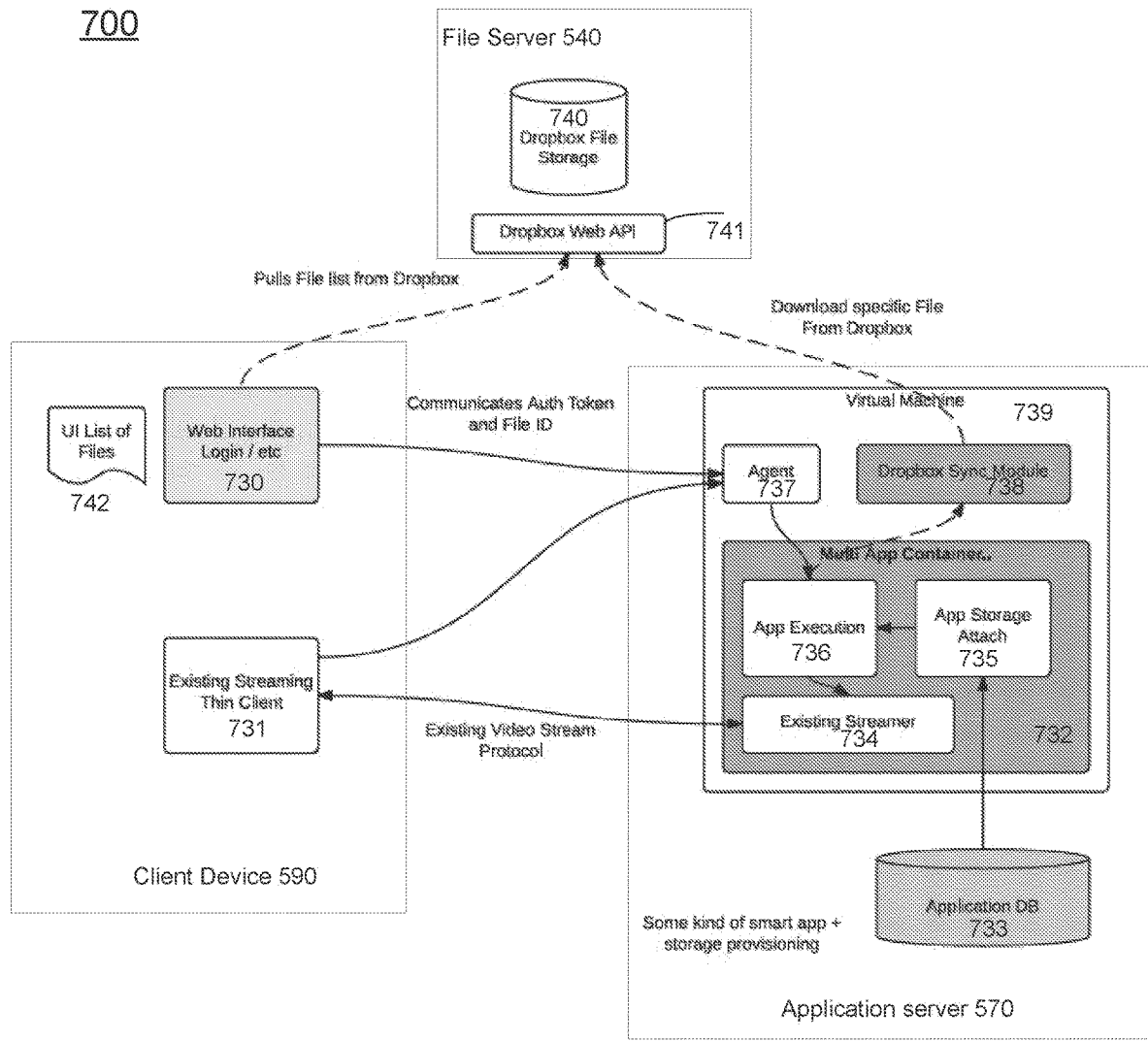
FIG. 7 is an illustration of an architecture that is configured to implement a cloud based virtualized application execution system for remote displays in accordance with an embodiment of the present invention.

FIG. 7 is an illustration of an architecture 700 that is configured to implement a cloud based virtualized application execution system for remote displays in accordance with an embodiment of the present invention. The cloud based virtualized application execution system comprises client device 590, application server 570 and file server 540. In one embodiment, the user logs into the cloud storage application through a login interface 730 and accesses a list of shared files 742 through a user interface similar to interface 521 illustrated in FIG. 5B. As illustrated in FIG. 7, the user accesses both the login interface 730 and the list of shared files 742 on the client device 590.

The login process accesses the file list 742 from the cloud storage 740, e.g., Dropbox through the Web Application Programming Interface (API) supplied by the cloud storage system, e.g., the Dropbox Web API 741. Both the Web API and the file storage can be located on the file server 540 as illustrated in FIG. 7.

As discussed in the GRID architecture applications in detail, application server 570 can be part of a cloud system providing distributed computing resources, including cloud based virtualized graphics processing for remote displays. In addition to cloud based virtualized graphics processing, embodiments of the present invention also enable the cloud system to provide application execution for remote displays. In one embodiment, a plurality of cloud systems works cooperatively to connect multiple computing resources together as a communication network. In one embodiment of the present invention, the cloud systems provide complete, virtualized application execution systems.

In one embodiment, a cloud system can comprise, for example, a plurality of physical servers, including application server 570. The physical application server 570 provides a host system that can support a plurality of virtual machines, including virtual machine 739. The operating environment of virtual machine 739 is run through a corresponding operating system, such as, a virtualized operating system, e.g., a Windows® operating system. The operating system gives virtual machine 739 the ability to execute applications, turn it into a video stream, and send it out a proper port and channel to a receiver at the client device 590. As discussed above, the client device includes any electronic device configured to communicate with the cloud system for an instantiation of a virtual machine. The client device, in one embodiment, can comprise at least a video decoder to decode the video stream and also a thin client application to capture user input and transmit it back to server 570. For example, the client device 590 may include a thin client, dumb server, mobile device, laptop computer, personal computer, etc.

When a user attempts to open a file from the list of files 742, an automated series of steps is launched in response in accordance with embodiments of the present invention. The automation is able to perform automatic provisioning of the file the user attempts to access on the cloud storage website. The authorization token and file identifier (file ID) is communicated to software agent 737 in virtual machine 739, wherein the agent 737 executes on the virtual machine 739 and communicates the file ID information to the multi-application container 732, wherein all the applications are stored. In one embodiment, the file identifier and authorization token can be part of a single identifier, which also comprises information regarding an account registered with the client device. The authorization token and file identifier can be communicated to the application server 570, for example, either at the time of file access or when the user first logs into the cloud storage site. Using the authorization token and file identifier, the synchronization module 738 can retrieve the corresponding file(s) from the file server 540.

The synchronization module 738 allows the list of files at virtual machine 739 to be synchronized with the online cloud storage 740. Depending on the types of files accessed by the user, the software agent 737 is configured to access any applications not available on virtual machine 739 from application database 733 and store it local to the virtual machine 739 in application storage attach module 735. In one embodiment, the application storage attach module 735 promotes efficiency by not requiring virtual machine 739 to have access to the universe of applications at the same time. Instead, if a file ID is received that is associated with an application that is not available, the agent 737 can dynamically access and install the application from database 733 when required into application storage attach module 735. In other words, the agent 737 can access applications from an application database stored on application server 750 (or one of the other servers within the cloud system) and dynamically attach that application to the running virtual machine 739 at application storage attach module 735.

In one embodiment, when a file is received from file server 540, the agent 737 determines an application associated with the accessed file using the metadata from the file, e.g., filename, file type, file size, full path name of the directory the file is stored in, the application the file was last opened with, etc. Typically, the application associated with the access file can be determined using the file type of the accessed file.

In one embodiment, the application database 733 can be configured to dynamically update the applications available on the database 733. For example, the application database 733 could scan files available on the cloud storage site, e.g., Dropbox to determine if any new applications corresponding to any unrecognized file extensions need to be downloaded.

In one embodiment, the agent 737 is configured to create the multi-application container 732, in response to receiving the authentication token and file ID from a client device 590. The agent 737, for example, receives a file corresponding to the file ID from the synchronization module 738, and creates the multi-application container 732 by retrieving the appropriate application associated with the file from application database 733. Further, the agent 737 may also be responsible for initiating the streaming protocol to stream the user interface of the executed application to the client via streaming module 734 and to receive user input back from the client.

In one embodiment, agent 737 can receive an additional token from client device 590 with information regarding the client device 590, e.g., information regarding if the client device is a mobile phone, a laptop etc. Using that information, in one embodiment, virtual machine 739 can be configured with different display adapters so that streamer module 734 streams video data that is most efficiently and seamlessly viewed on the display output of the receiving device 590. For example, it may do that by accessing and running a version of the application on execution module 736 that is specific to the client device, e.g., a mobile version of a word processing application.

Alternatively, in one embodiment, streaming thin client 731 can be configured to provide agent 737 information regarding the client device type. The agent would then take this information into account when creating the multi-application container 732 and configure the display adapters to perform the display formatting in accordance with the capabilities of the client device 590.

In one embodiment, after the multi-application container 732 has been created by agent 737, the application execution module 736 can access the application associated with the file ID (communicated from agent 737) from application storage module 735 and execute the corresponding application.

The results of the application execution are transferred via the streamer module 734 in virtual machine 739 to existing streaming thin client module 731 located at the client device 590. In one embodiment, agent 737 initiates the streaming protocol in software that enables a streaming connection to be created between thin client 731 and the streamer 734. The video stream is delivered as discussed in detail in the GRID architecture applications. In one embodiment, the streaming thin client module 731 can be a thin video decode receiver. The receiver decodes the encoded video frames transferred from the virtual machine 739 to the client device 590.

As discussed in the GRID architecture applications, virtual machine 739, in one embodiment, can be supported by a cloud based graphics processing system displays. The virtual machine executes an application that is typically selected by an end user for interaction. For example, the end user begins a gaming session with the cloud based graphics processing system with the intention of playing a cloud based gaming application through a corresponding instantiation of a virtual machine. The virtual machine while executing an application generates a video stream that comprises rendered images for display. The rendered video is ultimately encoded and streamed to a remote display for viewing by one or more end users through streaming module 734.

The application that is instantiated within the virtual machine 739 undergoes a loading process in order to initialize the application. In one embodiment, the loading process includes determining the proper configuration settings for the virtual machine when executing the application. The configuration settings may take into account the resource capabilities of the virtual machine, as well as the resource capabilities of the end client device. Further, virtual machine 739, in one embodiment, includes a graphics renderer (not shown) for performing graphics rendering to generate a plurality of frames forming the basis of a video stream. The graphics rendering is performed through execution of the application, wherein a video stream comprising a plurality of frames is transmitted to a client device 590 through streaming module 534. In one embodiment, the virtual machine 739 can also include a video encoder/decoder (not shown) that encodes the rendered video into a compressed format before delivering encoded video stream to a remote display through streaming module 734.

In one embodiment, if the user manipulates the requested file within the application using device 590, the streaming thin client 731 collects all the user generated inputs, e.g., keystrokes, etc. and relays them upstream to the streamer module 734 so the necessary modifications can be made to the file at the server 570. For example, the user-generated information can be streamed from the streaming client module 731 back to the streamer module 734 at the application server 570. The application execution module 736 then renders the results of all the user inputs within the executing application. In one embodiment, the synchronization module 738 can update the files on the file server 540 with the edited version of the file. In other words, in one embodiment, the various modifications of the user can be streamed up from the client device 590, the changes rendered at the application server 570, and the updated file synchronized back with the file server 540 through synchronization module 738. The synchronization module 738 transmits synchronization information concerning the user generated input back to file server 540 so that the necessary modifications can be made to the file.

Streaming the results of the executed application to a client advantageously allows client device 590 to run on minimal processing power because the application is rendered at the server 570 before the user interface is transmitted to the client device 590 in the form of a video stream As a result, client device 590 can be a dumb terminal and the user would still be able to interact with the application running on the server in the same way as if the application was running on the user's local machine. The other advantage of streaming the application to the client is that the client device 590 can be application agnostic—it can receive and display the results of all applications in the same way without needing to make application specific modifications.

By contrast, conventional cloud based applications, e.g., Google Docs® are not completely rendered at the server. The word processing application or spreadsheet in the Google Docs® suite, when executed, is rendered in JavaScript at the client device. In other words, the application is rendered locally, while transmitting back text and coordinates to the server in order for a copy of the data to be maintained in the cloud system.

In one embodiment, a relatively infrequently executed application, e.g., SolidWorks, may be run on a single virtual machine within the cloud system By comparison, a frequently accessed application, e.g., a word processing application may be replicated across multiple containers on multiple virtual machines in the cloud system Accordingly, when multiple users attempt to access several simultaneous copies of the word process application, multiple virtual machines are available to support the multiple client devices.

Figure 8:
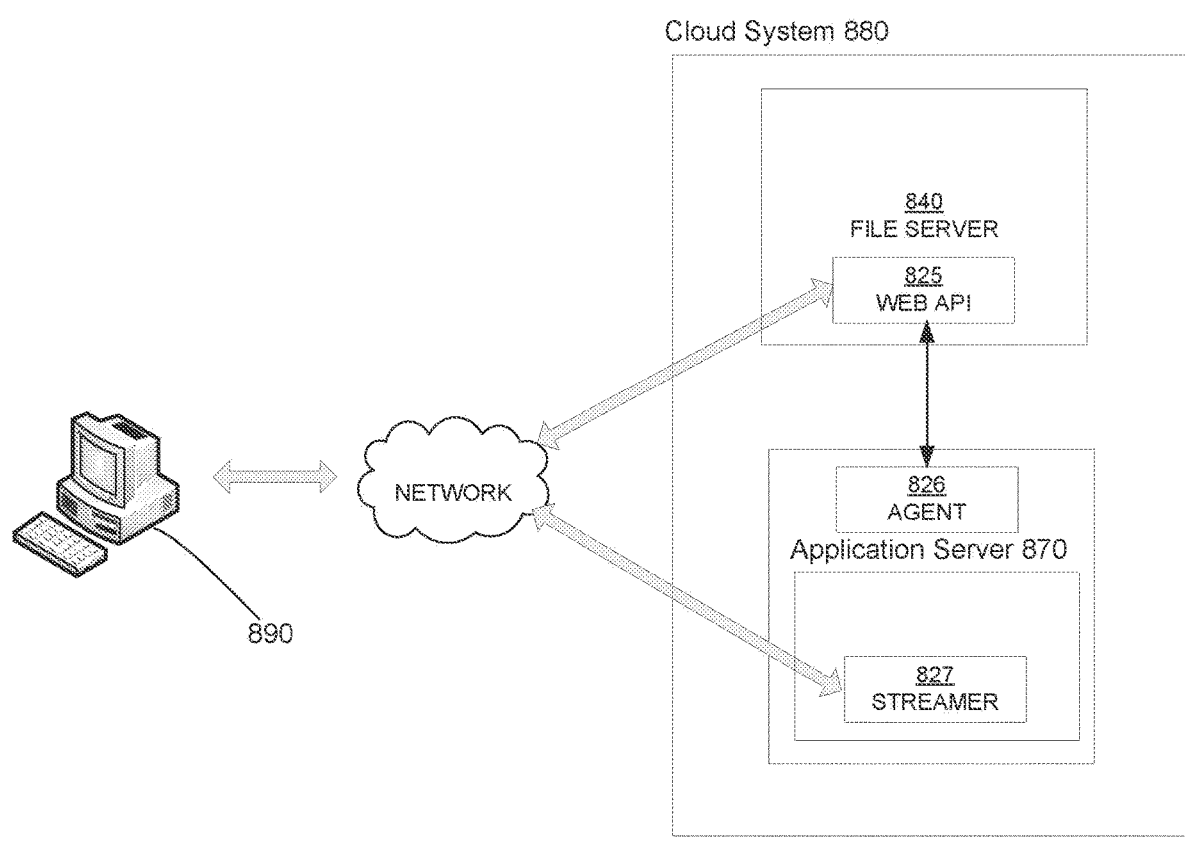
FIG. 8 is a high level block diagram illustrating the manner in which both the file storage and application execution can be implemented within a single cloud system in accordance with an exemplary embodiment of the present invention.

FIG. 8 is a high level block diagram illustrating the manner in which both the file storage and application execution can be implemented within a single cloud system 880 in accordance with an exemplary embodiment of the present invention. In one embodiment, a single entity may maintain both file server 840 and application server 870. In this embodiment, when a user attempts to open a file through Web API 825, instead of relaying the file ID and authorization code or token to a server on a third party cloud system, they are transmitted to agent 826 on application server 870 within the same cloud system.

Further, instead of redirecting the user to a different website, the application could be executed and rendered through the same website and streamed from streamer 827 on application server 870. In other words, when a user, for example, double clicks on a file from the list of files, the application executes and begins to be streamed to the user from the same website. The application may be run on a virtual machine instantiated on the same file server 840 or another server 870 on the same cloud system as file server 840. Accordingly, the user is not re-directed to a server hosted by a different company or entity.

In a different embodiment, a first entity may provide cloud storage through file server 540 on one cloud system, while a separate second entity may provide application execution services in a separate cloud system through application server 570. As shown in FIG. 7, in this embodiment, the Web API 741 can be configured to hand-off the user to a server operated by the second entity when the user attempts to access a file on file server 540. The user is re-directed to the interface operated by the second entity, wherein the application is executed and streamed to the user from the new interface.

Figure 9:
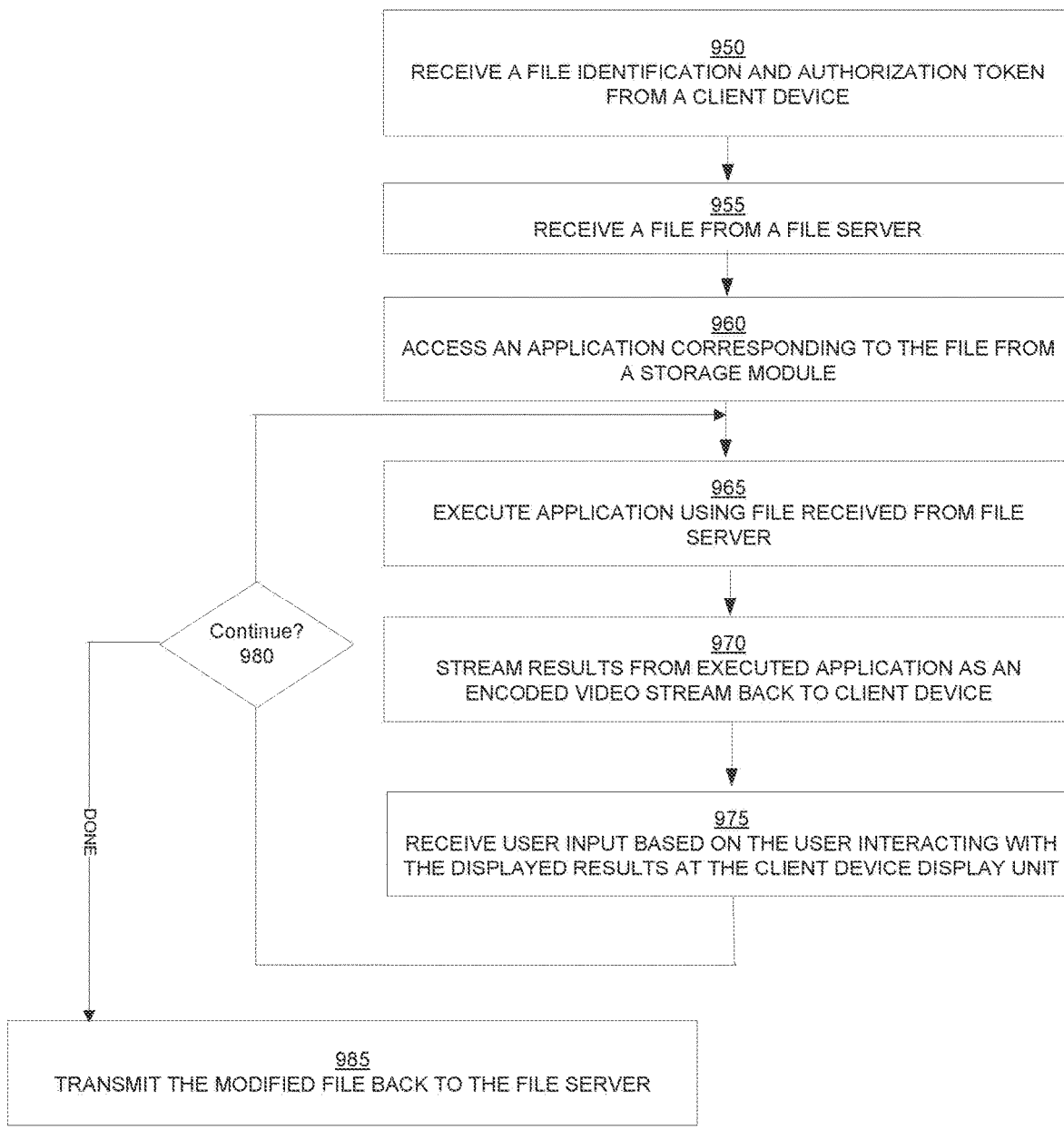
FIG. 9 depicts a flowchart of an exemplary computer controlled process flowchart of a computer-implemented method of executing applications in a cloud system in accordance with embodiments of the present invention.

FIG. 9 depicts a flowchart 900 of an exemplary computer controlled process flowchart of a computer-implemented method of executing applications in a cloud system in accordance with embodiments of the present invention. The invention, however, is not limited to the description provided by flowchart 900. Rather, it will be apparent to persons skilled in the relevant art(s) from the teachings provided herein that other functional flows are within the scope and spirit of the present invention.

At block 950, a file identifier and authorization token is received from a client device at a file agent of an application server.

At step 955, a file is received from a file server, wherein the file server stores a plurality of files from a plurality of users.

At block 960, an application is accessed from a storage module.

At block 965, the application is executed using the file accessed from the file server.

At block 970, the results of the application execution are streamed to the client device as an encoded video stream At block 975, user input is received based on the user interacting with the displayed results at the client device display unit.

If disclosure of components contained within other components should be considered as examples because many other architectures can be implemented to achieve the same functionality. If the application execution continues at block 985, then steps 965, 970 and 975 are repeated with the application continuing to execute. If the application aborts or is shut down, then the application terminates and the updated file is transmitted back to the file server at block 985.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer implemented method comprising:
   determining, by a cloud server, a file based on a selection, by a user of a file server, of the file from a user interface on a client device, wherein first data corresponding to the file is transmitted by the file server to cause a display of a graphical representation of the file using the user interface, and the file server is to, in response to the selection of the file, hand-off the user to the cloud server and re-direct the user to an interface that includes a display of a video stream and is operated by the cloud server;
   receiving, by the cloud server and based on the determining of the file, the file from the file server using login information associated with the client device; and transmitting second data that causes the display, on the client device, of the video stream in the interface, the video stream corresponding to an output of an application executing the file received by the cloud server.

2. The method of claim 1, wherein the client device pulls the file from the file server to display the graphical representation of the file in the user interface by logging into the file server using an application programming interface (API) of the file server.

3. The method of claim 1, wherein the file is accessed by the cloud server using an authorization token and a file identifier received from the client device.

4. The method of claim 1, wherein the executing the file modifies the file to create a modified file, and the cloud server transmits the modified file to the file server.

5. The method of claim 1, wherein the user interface and a list of files used by the client device to populate the user interface are provided to the client device by the file server.

6. The method of claim 1, wherein the user interface corresponds to a first website of the file server and the interface is on a second website of the cloud server.

7. The method of claim 1, wherein video of the video stream is rendered using a graphics pipeline of the cloud server.

8. The method of claim 1, further comprising:
executing, by the cloud server, the application using the file received from the file server; and
streaming, by the cloud server, the video stream to the client device.

9. The method of claim 1, further comprising:
accessing the application from an application database associated with the cloud server; and
instantiating the application on a virtual machine executing on the cloud server, wherein the output is of the application executing on the virtual machine.

10. The method of claim 1, further comprising receiving, by the cloud server, an authorization token in response to a user login to the file server from the client device to access the user interface for the selection of the file, wherein the login information used to receive the file from the file server includes the authorization token.

11. A processor comprising:
one or more circuits of a cloud server to:
receive login information from a client device in association with a selection, by a user of a file server, of a file in a user interface provided using the file server, wherein data corresponding to the file is transmitted by the file server to the client device to cause a display of a graphical representation of the file using the user interface, and the file server is to, in response to the selection of the file, hand-off the user to the cloud server and re-direct the user to an interface that includes a display of a video stream and is operated by the cloud server,
retrieve the file from the file server using the login information in response to the selection of the file, and
stream output the video stream for the display in the interface on the client device, the video stream generated from executing an application using the file.

12. The processor of claim 11, wherein the one or more circuits are further to:
receive from the client device, user input associated with the executing the application using the file, and
apply the user input to the application during the executing the application using the file.

13. The processor of claim 11, wherein the client device pulls the file from the file server to display the graphical representation of the file in the user interface by logging into the file server using an application programming interface (API) of the file server.

14. The processor of claim 11, wherein the retrieving the file uses an authorization token and a file identifier received from the client device.

15. The processor of claim 11, wherein the executing the application using the file modifies the file to create a modified file, and the one or more circuits are further to transmit the modified file to the file server.

16. A system comprising:
one or more processing units to execute operations comprising:
receiving, by a cloud server, an identifier of a file based on a selection, by a user of a file server, of the file from a user interface on a client device, wherein data corresponding to the file is transmitted by the file server to cause a display of a graphical representation of the file using the user interface, and the file server is to, in response to the selection of the file, hand-off the user to the cloud server and re-direct the user to an interface that includes a display of a video stream and is operated by the cloud server;
accessing, by the cloud server, the file on the file server using the identifier of the file; and
streaming, by the cloud server, the video stream for the display in the interface on the client device, the video stream corresponding to results from executing an application using the file accessed on the file server.

17. The system of claim 16, wherein the client device pulls the file from the file server to display the graphical representation of the file in the user interface by logging into the file server using an application programming interface (API) of the file server.

18. The system of claim 16, wherein the file is accessed using an authorization token and the identifier received from the client device.

19. The system of claim 16, wherein the user interface and a list of files used by the client device to populate the user interface are provided to the client device by the file server.

20. The system of claim 16, wherein the executing the application using the file modifies the file to create a modified file, and the operations include transmitting the modified file to the file server.

* * * * *